United States Patent [19]

Hoshall

[11] 4,234,274
[45] Nov. 18, 1980

[54] FILTER DEVICE FOR FIBROUS MATERIALS

[76] Inventor: Tom C. Hoshall, 4005 N. Pennsylvania, Oklahoma City, Okla. 73112

[21] Appl. No.: 42,000

[22] Filed: May 24, 1979

[51] Int. Cl.³ .............................................. B65G 53/28
[52] U.S. Cl. ..................................... 406/93; 209/144; 406/99
[58] Field of Search ..................... 209/144; 406/49, 99, 406/931; 222/102, 189; 210/512 R, 512 M

[56] References Cited

U.S. PATENT DOCUMENTS

| | | | |
|---|---|---|---|
| 1,908,181 | 5/1933 | Prouty | 209/144 |
| 2,721,655 | 10/1955 | Pritchett | 209/144 X |
| 3,175,866 | 3/1965 | Nichol | 406/99 |
| 3,314,732 | 4/1967 | Hagan | 406/102 X |

Primary Examiner—William A. Cuchlinski, Jr.
Attorney, Agent, or Firm—Robert M. Hessin

[57] ABSTRACT

A fibrous materials filter device, particularly raw fibrous insulation material, which is used in combination with a centrifugal blower machine to remove projectible objects from the material while also avoiding damage to the blower impeller and housing. The filter device consists of a housing defining a volume and having a tangential input pipe and axial output pipe for affixure to the axial input of a centrifugal blower machine.

7 Claims, 5 Drawing Figures

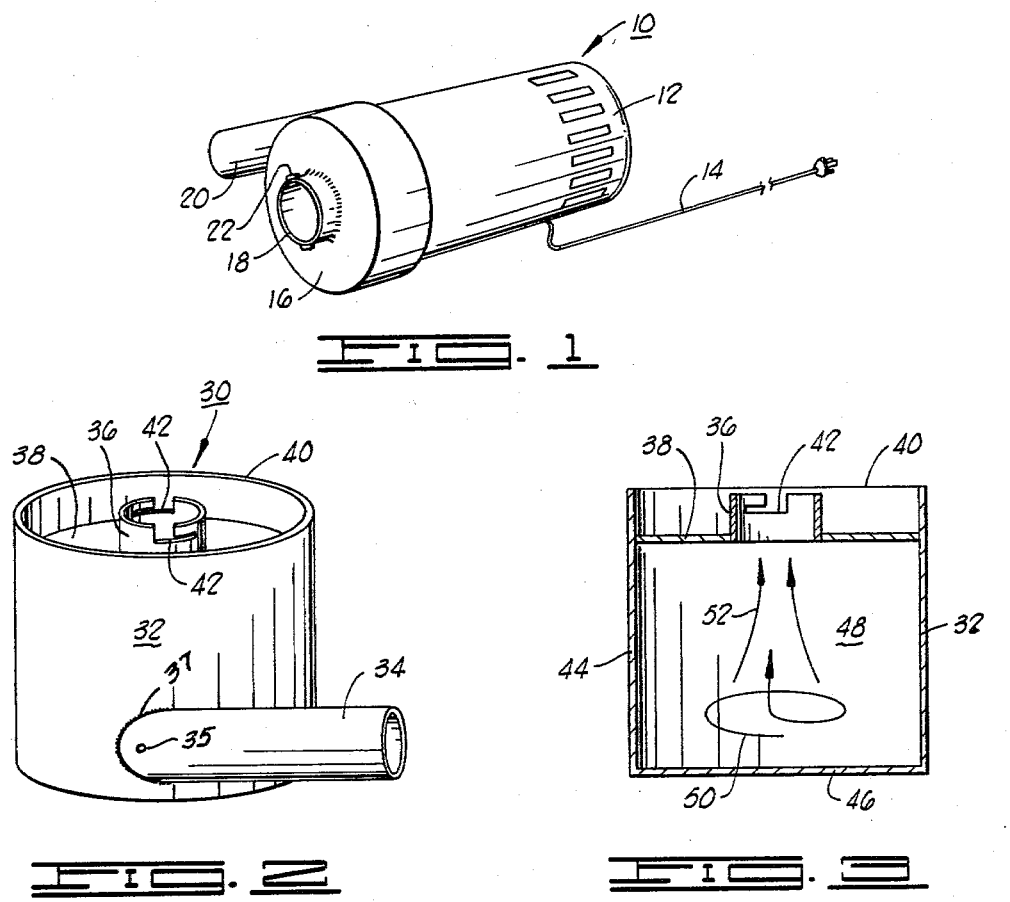
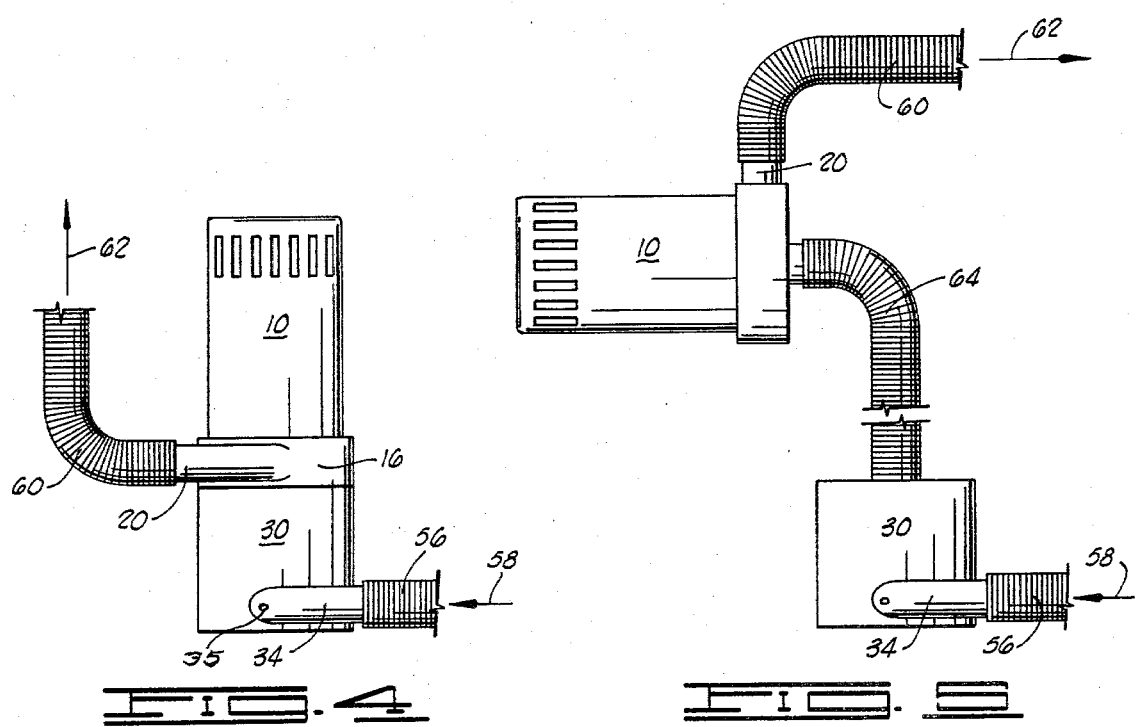

FILTER DEVICE FOR FIBROUS MATERIALS

BACKGROUND OF THE INVENTION

1. Field of the Invention

The invention relates generally to fibrous material filter devices and, more particularly, but not by way of limitation, it relates to an improved cyclonic filter apparatus for use in combination with a centrifugal blower machine.

2. Description of the Prior Art

The prior art includes numerous types of cyclone separator devices for use with varying types of materials, both liquid and dry, wherein a continuous stream of processed material is further refined through separation by particle size and weight differential. There is nothing in the prior art, at least that is known to Applicant, that is suitable for use in combination with a centrifugal blower as utilized for moving fibrous materials such as home insulation, rockwool and the like, for insulative placement when withdrawn from a reservoir pile or storage container.

The present invention overcomes the prior art shortcomings by providing a cyclonic separator which can be used in direct combination with a centrifugal blow machine to separate rocks, nails and other heavier particles from the fibrous insulation materials thereby to prevent both damage to the centrifugal blower equipment and to provide greater safety in the environment of the insulation placement operation.

SUMMARY OF THE INVENTION

The invention consists of a housing which forms a reactance enclosure for receiving a tangential input of fibrous insulation material or the like and, while heavier, dangerous particles are entrapped within the enclosure, the fibrous material is withdrawn centrally axially for input to the central axial opening to the centrifugal blower which, in turn, provides tangential output to the hose or other delivery device that places the fibrous material at its designated position. The housing forming the enclosure is essentially cylindrical in volume; however, volumetric shape is not entirely respective and it may well be advantageous for treatment of certain materials to provide a conical housing capable of delivering an increase between output and input pressures.

Therefore, it is an object of the present invention to provide a filter device which can be used in combination with a centrifugal blower in the field during deposition of fibrous materials such as home insulation.

It is also an object of the invention to provide an apparatus for filtering the throughput of a fibrous material centrifugal blower thereby to enable much greater deposition or delivery of the fibrous materials at the receiving site.

It is yet another object of the present invention to provide a safer device for deposition of home insulation that removes all foreign objects having propensity for projectile flight from the body of the insulation material.

Finally, it is an object of this invention to provide a mechanism for filtering input of fibrous material to a centrifugal blower thereby to avoid damage to the impeller and guard housing of the blower machine.

Other objects and advantages of the invention will be evident from the following detailed description when read in conjunction with the accompanying drawing which illustrate the invention.

BRIEF DESCRIPTION OF THE DRAWING

FIG. 1 is a perspective view of a conventional form of centrifugal blower machine as it is present in the prior art;

FIG. 2 is a side view in perspective of a filter separator as constructed in accordance with the present invention;

FIG. 3 is a view in vertical section of the separator filter device shown in FIG. 2;

FIG. 4 is a side elevation of the filter device of the invention in combination with a centrifugal blower machine; and FIG. 5 is an alternative showing of a filter device in combination with a centrifugal blower machine.

DETAILED DESCRIPTION OF THE INVENTION

FIG. 1 illustrates a conventional form of centrifugal blower machine 10 of a type which is well-known and widely used today in the distribution and placement of such as fibrous home insulation within established buildings and/or residences. The blower machine 10 consists of an electric motor portion 12 as powered by a-c electrical connector 14 to provide a rotary motion to a multi-bladed impeller (not specifically shown) as housed within a blower housing 16. Blower housing 16 includes an axial input connector 18 and a tangential output connector 20, and each of input 18 and output 20 include flange locking portions such as tabs 22 to provide secure connection with flexible hose members as required.

Thus, as specifically used in the home insulation industry, a flexible hose is connected to input 18 with the other end directed to the fibrous material reservoir as it may be stacked on the ground or bin-retained, and a second flexible hose (not shown) may be connected to output 20 and extended for sufficient length to extend upward into attic space or other insulation repository within a building. The rotary impeller within housing 16 may consist of such as a ten blade centrifugal impeller which is driven at high speed to draw fibrous material through inlet 18 for desimination under increased pressure out of output 20 and into the flexible delivery hose. One well-known form of conventional blower machine is the AMETEK model blower that is commercially available from Lamb Electric of Kent, Ohio.

A current problem in the home insulation placement industry is the fact that foreign materials present in the fibrous material tend to be drawn into the blower machine housing 16 and rotated at great velocity prior to exhaust through output 20. In some cases, such foreign material such as heavy objects, rocks, tacks, nails and the like are present in the raw fibrous material, and in still other cases materials are incidentally picked up around the work site during deposition and placement of the fibrous insulation material. In either event, they often cause destruction of the impeller blades and excessive wear and even breakage to the cast aluminum housing 16, such that the service life of a blower machine is greatly reduced. It has been found that these problems are elevlated by inclusion of a filter device 30 as shown in FIG. 2 when used in direct combination with the blower machine.

Thus as shown in FIG. 2, the filter device 30 consists of a housing 32, shown as being generally cylindrical, that includes a tangential input pipe 34 and an axial output 36. The input pipe 34 is welded, as at welds 37, to provide tangential input flow to the internal enclosure of housing 32, and axial flow then proceeds through output 36 as drawn by the air pressure from blower machine input 18. A small orifice 35 is formed adjacent the joinder in the input pipe 34 to reduce possibilities of fiber compaction.

The output pipe 36, as welded on a circular top panel 38, is recessed within an upper comb 40 so that it provides rigid seating when filter device 32 is affixed to blower machine 10. That is, the output pipe 36 is formed for direct insertion over the inlet 18 of blower machine 10 before twist seating of lock tabs 22 (FIG. 1) within locking slots 42 (FIG. 2). When the central pipes are so seated, the comb 40 abuts tightly against the outer circumfery of blade housing 16 (FIG. 1).

FIG. 3 illustrates in section the interior of filter device 30. Thus, the housing 32 consists of cylindrical side wall 44 and circular bottom 46, as closed over by top plate 38 to define a central cylindrical enclosure 48. Input of fibrous material under pressure as tangentially received into enclosure 48 follows generally along the line 50 such that heavier objects such as stones, nails, plaster and the like are thrown off centrifugally and retained within enclosure 48 while the lighter fibrous material follows upward as per arrows 52 for axial flow through output 36 and into axial input 18 (FIG. 1) of the centrifugal blower machine 10.

In operation, the combination device may be operated in direct connection as shown in FIG. 4 wherein the filter device 30 is directly affixed to the blower machine 10. In this mode, a flexible hose 56 is affixed for operation at a fibrous material reservoir to pick up the insulative batting or such. Incoming fibrous material from direction 58 by flexible hose 56 is then filtered through filter device 30 and axially input to the centrifugal blower housing 16 for output through tangential output 20 and a flexible hose 60 in direction 62 to the final placement position within the building structure.

Thus, an operator may be located up in an attic or other relatively remote position to direct the outlet end of flexible hose 60 as the insulation is applied. Since the raw insulation is often treated haphazardly around the work site, there quite often are rocks and nails as well as the inherently present solid stuffs which then find centrifugal separation in the filter device 30.

FIG. 5 illustrates an alternative embodiment of the operation of the same components wherein an intermediate flexible hose 64 is utilized for connection between the axial outlet 36 of filter device 30 and the axial input 18 of blower machine 10. This mode of operation is available if the particular exigencies of a construction site should so require. The functional operation is still the same in that dangerous heavier materials are separated and remain in filter device 30 while the lighter fibrous batting is conveyed up flexible hose 64 to blower 10 for final delivery and deposition at its proper placement.

The foregoing discloses a novel filter device for use in combination with a fibrous materials blower which enables an increase in safety to the user as well as a much improved equipment protection standard. Thus, hard or sharp heavier objects finding entry at the fibrous materials reservoir are eliminated prior to passage through the centrifugal blower so that they connot damage the blower impeller or channel housing, nor will they be exhausted up into the end depository. The present invention has proven particularly valuable in the home insulation industry as it provides a greater degree of safety and increased equipment life when placing or replacing fibrous insulation in existing building structures.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A fibrous materials filter device for use in combination with a power driven centrifugal blower apparatus of the type having an axial materials input and tangential materials output, comprising:
   housing means having top, bottom and sides and forming an enclosure, and including an input opening in generally tangential direction to said enclosure as formed at a side bottom location, and an output opening in axial direction to said enclosure as formed centrally through said top;
   an orifice formed in said input opening adjacent its tangential juncture to said enclosure; and
   means for connecting said housing means output to said blower apparatus materials input.

2. A device as set forth in claim 1 wherein said means for connecting comprises:
   cylindrical comb means including locking slot for rigid affixure to said blower apparatus materials input.

3. A device set forth in claim 2 wherein said housing means further includes:
   second cylindrical comb means formed around the top outer edge of said housing means for rigid abutment against the adjoining blower apparatus when said locking slot is engaged in rigid affixure.

4. A device as set forth in claim 1 wherein said means for connecting comprises:
   flexible base means of preselected length interconnecting said housing means output and said materials input.

5. A device as set forth in claim 1 wherein said housing means forms an enclosure that is a body or revolution having top and bottom parallel.

6. A device as set forth in claim 1 which further includes:
   flexible base means of preselected length rigidly connected to said housing means input opening.

7. A device for transporting and depositing fibrous material such as home insulation, comprising in combination
   housing means having a top, bottom and sides and being formed to include a tangential input opening at one end with an axial output at the opposite end;
   an orifice formed in said housing means adjacent to said tangential input opening;
   centrifugal blower means having an axial input and a tangential output;
   power means for driving said centrifugal blower means;
   means sealingly connecting said housing means axial output to said blower means axial input;
   flexible hose means connected to said housing means tangential input and extending a preselected length from communication with a reservoir of said fibrous material; and
   second flexible hose means connected to said blower means tangential output and extending a preselected length for depositing said fibrous material in predetermined manner.

* * * * *